US005667877A

United States Patent [19]

Tajiri et al.

[11] Patent Number: 5,667,877

[45] Date of Patent: Sep. 16, 1997

[54] LAUNDRY TAG, LAUNDRY TAG SHEET AND METHOD OF PRODUCTION OF THE SAME

[75] Inventors: Koumei Tajiri; Eizo Matsuki; Kazuhide Yamakawa, all of Ehime-ken, Japan

[73] Assignee: Daio Paper Corporation, Ehime-ken, Japan

[21] Appl. No.: 457,696

[22] Filed: Jun. 1, 1995

[30] Foreign Application Priority Data

Nov. 25, 1994 [JP] Japan .................................... 6-291303
Feb. 28, 1995 [JP] Japan .................................... 7-039957

[51] Int. Cl.[6] ........................................ B32B 3/00

[52] U.S. Cl. .......................... 428/195; 428/212; 428/346; 428/411.1; 428/488.4; 428/500; 428/913

[58] Field of Search ................................ 428/195, 411.1, 428/161, 192, 346, 537.5, 913, 212, 488.4, 500

[56] References Cited

U.S. PATENT DOCUMENTS 5,114,187 5/1992 Branch ...................................... 283/81

FOREIGN PATENT DOCUMENTS 2-111178 9/1990 Japan .

*Primary Examiner*—William Krynski
*Attorney, Agent, or Firm*—Lowe, Price, LeBlanc & Becker

[57] ABSTRACT

A laundry tag is obtained having excellent solvent-resistant and water-resistant adhesive layers, which is durable to both dry cleaning and washing with water. The laundry tag comprises an elongated substrate 1, a solvent-resistant adhesive 3 on one side at distal ends thereof and water-resistant adhesive layers 3 in the inner side of said solvent-resistant adhesive. After the tag is threaded through part of the laundry item, the adhesive layers 2, 3 are adhered to each other so that the tag will form a loop. The laundry item is dry cleaned and washed with water while the laundry tag is attached to the laundry item.

7 Claims, 20 Drawing Sheets

BAR CODE
PIECE NUMBER
1
BAR CODE
PIECE NUMBER
1
NAME
Mr. JACK
PIECE NUMBER
1
3B
1
3A
2
4

LAUNDRY TAG, LAUNDRY TAG SHEET AND METHOD OF PRODUCTION OF THE SAME

BACKGROUND OF THE INVENTION

The present invention, relates to a laundry tag (which is also referred to as "laundry ticket) bearing characters, symbols (including bar codes) representative of various items of information on customers, cleaners, garments to be cleaned, which is attached to the garments for inventory from the receipt of the garments at the cleaner to return to the customer, a laundry tag sheet including the tags and a method of production of the same.

The present invention relates in particular to a tag including an elongated substrate, which is provided with an adhesive layer at opposite ends on one side thereof, said tag being attached to an item to be cleaned by being threaded therethrough and by bringing the adhesive layers at opposite ends together so that the tag will become a loop. The item will be dry or water washed while the tag is attached thereto.

RELATED ART

The laundry tags which are currently predominantly used generally comprise a water-resistant paper substrate and are attached to laundry articles at one end thereof with a staple. In this case, there is a drawback in that the staple may be hooked to other garments, which cause them to be damaged.

Japanese Patent Publication No. Jikkai Hei 2-111178 proposes a laundry tag comprising an elongated substrate having an adhesive layer at each of the opposite ends thereof, which is threaded through an article to be cleaned and the adhesive layers are brought together to form a loop. The article will be dry-cleaned while the tag is attached thereto. The proposal aims at laminating a plastic film layer on the substrate and forming an adhesive layer on the film layer.

It is a purpose of the above-mentioned prior art to prevent dry cleaning solvent from penetrating into the adhesive layer as little as possible with the film layer. Examples of the adhesive are limited to natural rubber, styrene-butadiene rubber, polyvinyl alcohol, acryl resins.

In the laundry field, depending upon the stains on the article dry-cleaning, washing with water and a combination of dry cleaning and subsequent washing with water are conducted. Recently, the last combined cleaning has increasingly been conducted.

Accordingly, both solvent-resistance and water-resistance are required for the adhesive of laundry tag. A recent study made by present inventors shows that no adhesives are disclosed in the prior art which have both solvent resistance and water resistance, and that the prior art solves problems in view of tag structure, not the adhesive per se.

It has been found that provision of a film layer is not a complete solution.

It is an object of the present invention to provide a laundry tag which has excellent solvent resistance and water resistance, so that it is endurable for both dry and water cleaning, and a method of producing the same.

SUMMARY OF THE INVENTION

In order to overcome the above mentioned problem, there is provided a laundry tag including an elongated substrate and adhesive layers at opposite ends on one side thereof, which is threaded through part of a laundry item and then adhered at the adhesive layers so that it is looped and in which cleaning of the laundry item is conducted while the tag is attached to the laundry item is characterized in that said adhesive layers each comprises a solvent-resistant adhesive and a water-resistant adhesive and in that these adhesive layers are formed on one side of the substrate at different areas.

Said substrate is preferably made of paper and a liquid penetration preventing layer is formed on the substrate, and said solvent-resistant adhesive layer and water-resistant adhesive layer are preferably formed on the liquid penetration preventing layer.

It is preferable that said liquid penetration preventing layer is made of an acrylic resin emulsion having heat-resistance and no adhesion which is not softened at temperatures not higher than 180° C.

It is preferable that said solvent resistant adhesive layer is formed on the substrate at the distal end thereof and said water-resistant adhesive layer is formed in inner position relative to said solvent-resistant layer.

In a preferred embodiment, said solvent-resistant and water-resistant adhesive layers are formed at one end on one side of the substrate and only water-resistant adhesive layer is formed at the other end thereof on the same side in such a position that the latter water-resistant adhesive layer faces the water-resistant adhesive layer when the tag is looped by bringing the adhesive layers together.

A plurality of the laundry tags as mentioned above are juxtaposed to each other and temporarily adhered to a release sheet which is treated to provide the sheet with releasability.

A first process for producing laundry tag sheets each including an elongated substrate and adhesive layers on one side thereof at opposite ends on one side thereof, which is threaded through part of a laundry item and then adhered at the adhesive layers so that is looped and in which cleaning of the laundry item is conducted while the tag is attached to the laundry item, comprises the steps of:

- providing a first adhesive coated web roll by applying the first adhesive on a double side releasably-treated release continuous web to form thereon continuous adhesive stripes spaced in a width direction and taking up the web after dried while the release web is conveyed;
- on the other hand, providing a second adhesive coated substrate web roll by applying a second adhesive on a raw substrate web to form thereon continuous adhesive stripes spaced in a width direction and drying it,
- overlapping said first adhesive coated web on said second adhesive coated substrate web so that said first and second adhesive layers are located in the same side;
- then taking up the overlapped webs into a semiproduct roll;
- delivering the webs from said semiproduct roll; and
- forming the substrate with slits each having a size equal to that of a tag by flat sheet working to provide laundry tag sheet including tags juxtaposed on the release sheet.

A second process for producing laundry tag sheets each including an elongated substrate and adhesive layers at opposite ends on one side thereof, in which each tag is threaded through part of a laundry item and then the adhesive layers are adhered to each other so that the tag is looped and cleaning of the laundry item is conducted while the tag is attached to the laundry item, comprises the steps of:

- providing a first adhesive coated overlapped web roll by applying the first adhesive on a single-side releasably-treated release continuous web to form thereon continuous adhesive strips spaced in a width direction and by overlapping the web on a substrate web and taking up the overlapped webs after dried while the first single-side releasably treated web is conveyed;

on the other hand, providing a second adhesive coated overlapping substrate webs having only one side releasably treated by applying a second adhesive on a raw substrate web to form thereon continuous stripes spaced in a width direction and drying it, overlapping said first adhesive coated web on said second adhesive applied raw web so that said first and second adhesive layers are located on the same side;

releasing said first single side release web from said substrate web to supply only the substrate sheet to an adhering position;

adhering said substrate web on to said second adhesive coated overlapping web to take up the webs into a semiproduct roll;

then taking up the overlapped webs into a semiproduct roll;

delivering the webs from said semiproduct roll; and forming the substrate with slits each having a size equal to that of a tag by flat sheet working to provide laundry tag sheet including tags juxtaposed on the release sheet.

The laundry tag of the present invention can be most advantageously used for dry cleaning and washing with water.

The laundry tag comprises an elongated substrate, for example water-resistant paper substrate and adhesive layers at the ends on one side thereof. After the tag has been threaded through part of a laundry item such as button hole, and a brand identification tag of the neck of suits, the adhesive layers are adhered to each other so that it will form a loop. Cleaning, such as dry cleaning and washing with water is conducted while the tag is attached to the laundry item.

In accordance with the present invention, said adhesive layers comprise a solvent-resistant adhesive layer and a water-resistant adhesive layer, which are formed on the substrate at different areas.

Accordingly, even though the adhesion strength of the water-resistant adhesive will be lowered by used solvent during dry cleaning, the solvent-resistant adhesive keeps the necessary bonding strength. Thereafter, although the adhesion strength of the solvent-resistant adhesive is lowered by water used for washing, the water-resistant adhesive will keep a necessary bonding strength. Therefore, the tag will never be released from a laundry tag over an entire period of cleaning.

Adhesives have a tendency to recover original adhesion strength after contact of the adhesive with the solvent or water is terminated as far as it is not dissolved in solvent or water although the adhesion strength is lowered due to contact with solvent or water. Accordingly, in accordance with the present invention, a loop of the tag is kept due to adhesion strength of an adhesive layer so that release of the tag is prevented even if the other adhesive layer is lowered. If dry cleaning is completed, the adhesion strength of the water resistant adhesion will be recovered. The tag will be durable for washing with water. As a result, the structure of the present invention may effectively function.

Overlapping of the solvent-resistant adhesive layer on the water-resistant adhesive layer was investigated. If the adhesion strength of one of the adhesive layers is lowered due to contact with solvent or water, for example, the adhesive strength of the water-resistant adhesive layers is lowered, the separation between the adhesive layers may occur since there is no support for the loop. As a result, initial function will not perform.

It is preferable that the solvent-resistant be formed on the substrate at the distal end thereof and the water-resistant adhesive layer be formed in the inner side thereof in the present invention. The looped bonded tag is more liable to be released at the distal end than the inner side. Accordingly, the solvent-resistant adhesive layer is formed at the distal end of the substrate for the purpose of preventing releasing since dry cleaning is firstly conducted.

In more preferable embodiment of the present invention, a solvent-resistant adhesive layer and a water-resistant adhesive layer are formed at one end on one side of the substrate, only a water-resistant adhesive layer is formed on the same side at the other end of the substrate in such a position that it faces the former water-resistant adhesive layer when the tag is looped by adhering the opposite ends thereof. Accordingly, the water-resistant adhesive layers are overlapped to each other when the laundry tag is in use. As a result, the water-resistant adhesive layers exhibit, so-called self-adhesion.

Washing with water lasts for a period of 30 to 60 minutes, which is longer than dry cleaning period of time which is about 5 to 10 minutes so that the bonding strength is largely lowered. After passage of enough period of time since water-resistant adhesive layers are applied to the substrates, they are delivered to cleaners as products. For this period of time, the water-resistant adhesive soaks enough into the substrate so that the adhesive layer is firmly bonded to the substrate. Since the water-resistant adhesive layer exhibit self-adhesion mutually, the self-bonding strength is high. Accordingly, the bonding strength against release is higher than that obtained in case a cleaner firstly adheres the water-resistant adhesive layer to an opposite looped substrate and is just to use it. As a result, a tag which is durable enough for washing with water can be obtained.

On the other hand, if adhesive layers are formed at opposite ends of a substrate, it would be difficult to pass through a button hole due to existence of the adhesive layer. Although it is preferable that an adhesive layer be formed at only one end of the tag for ease of passing into a button hole, it is necessary to apply a water-resistant adhesive layer at the other end of the tag to be durable for washing with water. Dry cleaning resistance can be obtained only by forming a solvent resistant adhesive. Both ease of passing into a button hole and resistance to washing with water can be met by forming no solvent resistant adhesive layer, but only the water resistant adhesive layer at the other end thereof.

The substrate is preferable, made of paper in view of reducing cost. Paper substrate has an printability for various items of information which is more excellent than that of plastic sheet.

In such a manner, an advantage due to the fact that the substrate is made of paper is great. In contrast to this, even water-resistant paper is used as paper substrate, liquid for dry cleaning and washing with water will penetrate into paper substrate, which may use the bonding strength of the solvent-resistant and water-resistant adhesive layers to be lowered.

Therefore, it is preferable to form a liquid penetration preventive layer on the paper substrate and to form the solvent-resistant and water-resistant adhesive layers on the liquid penetration preventive layer.

It is preferable that the liquid penetration preventive layer have heat-resistance and no adhesion, which will not be softened at temperatures not higher than 180° C. Materials having these physical properties include solvent type polyester, polyester laminate and acrylic resin emulsion, and the like. Particularly, acrylic resin emulsion is preferably selected in view of that its affinity with adhesive layer is excellent. Adhesion which is exhibited by this material will hinder passing into the button hole. Since ironing is possible after completion of washing, it is necessary to avoid cleaned garment from becoming dirty due to adhesive softened by heat from a heated iron. Therefore, material having a heat resistance which will not soften at temperatures not higher than 180° C. is selected.

The laundry tag sheet includes a plurality of laundry tags which are jaxtaposed each other and is temporarily bonded on the releasably-treated sheet. Cleaners will peel each laundry tag from the release sheet and may attach it to the garment to be cleaned.

DESCRIPTION OF EMBODIMENTS

Now the present invention will be described in more detail by way of embodiments with reference to drawings.

Basic Embodiment 1

Figure 1:
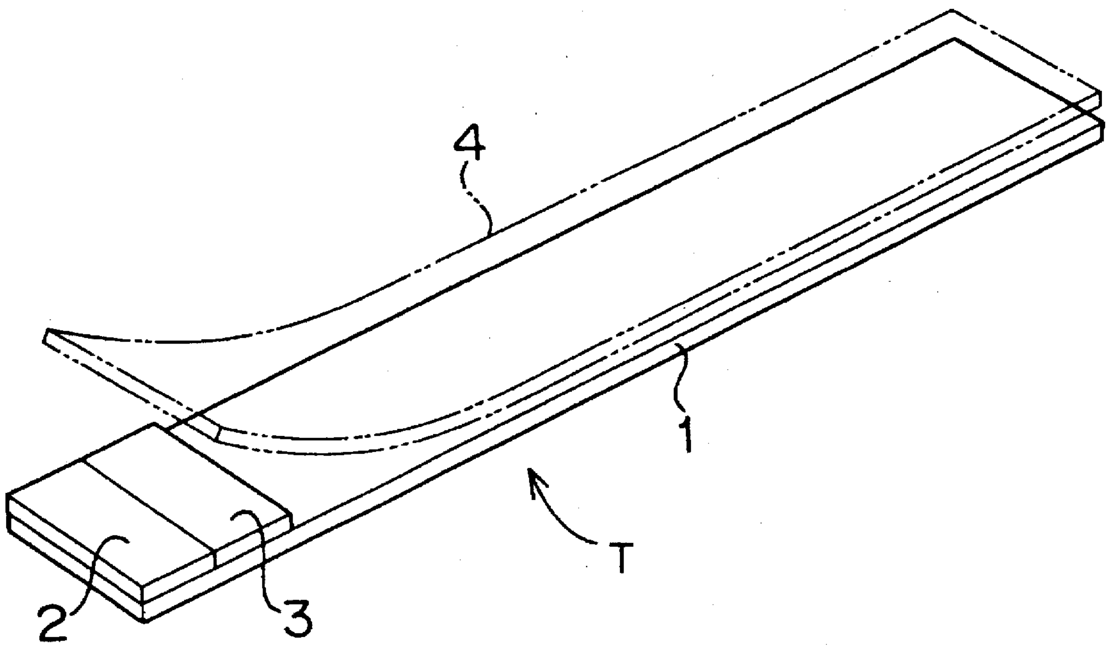
FIG. 1 is a perspective view showing a first basic embodiment of a laundry tag of the present invention.
Figure 2:
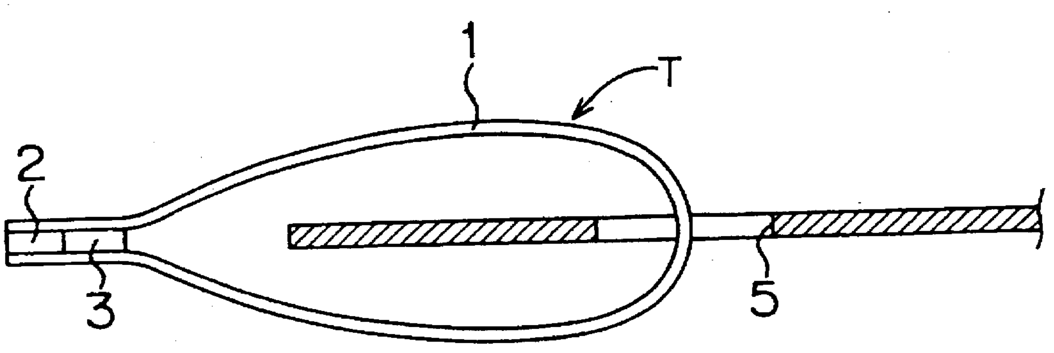
FIG. 2 is a longitudinal sectional view showing the attachment of the laundry tag to a laundry item.

Referring now to FIGS. 1 and 2, there is shown a laundry tag T of the present invention. The tag T comprises an elongated water-resistant substrate of paper 1, a solvent-resistant adhesive layer and a water-resistant adhesive layer which are formed at one end of the substrate at different areas thereof.

In a preferred embodiment of the present invention, the solvent-resistant adhesive layer 2 is formed on the substrate 1 at distal end thereof and the water-resistant adhesive layer 3 is formed on the substrate on the inner side of the layer 2.

Since handling of the tag T is inconvenient if each of the adhesive layers 2 and 3 is exposed prior to use, the tag T is temporarily adhered to a release sheet 4. In use of the tag T, it is peeled from the separable sheet 4. On end portion of the tag T is then threaded through a button hole 5 of a laundry item such as shirts and then the adhesive layers 2 and 3 are brought together with that at the other end portion so that the tag becomes looped. The laundry item will be dry cleaned or washed with water while the tag is attached thereto.

As seen from FIG. 2, one end portion of the tag is liable to be peeled from that at the other portion when it is looped in the shape. Firstly, dry cleaning is conducted. Therefore, the solvent-resistant adhesive layer 2 is formed in the distal end side of the substrate 1 and the water-resistant adhesive layer 3 is formed in the inner side of the layer 2. However, the layers 2 and 3 may be reversed in position depending upon the choice of adhesive agent.

Figure 3:
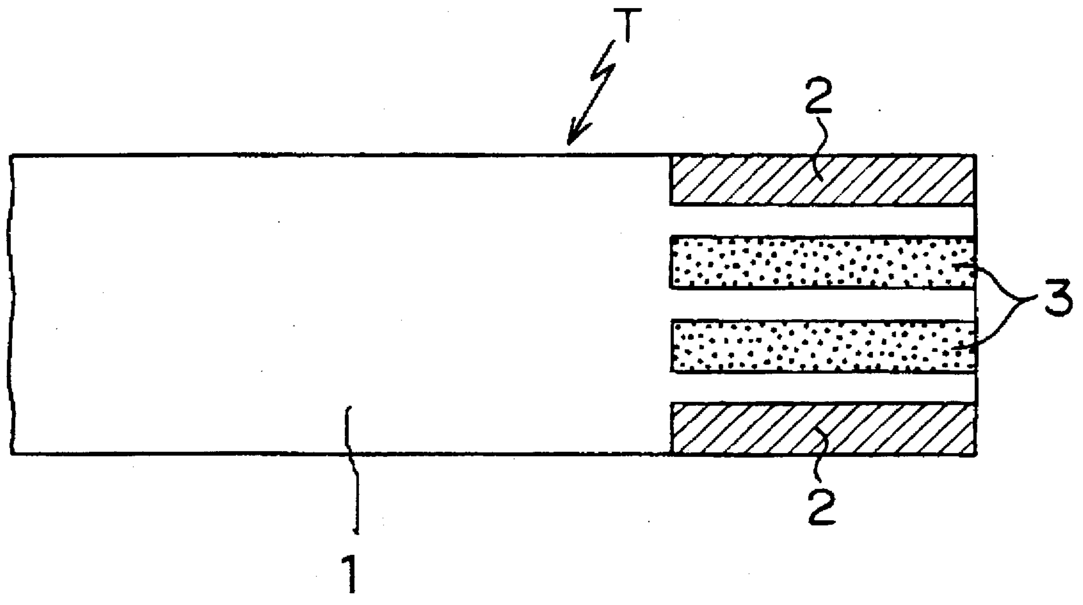
FIG. 3 is a plan view showing a modified version of a coatings of the adhesive.
Figure 4:
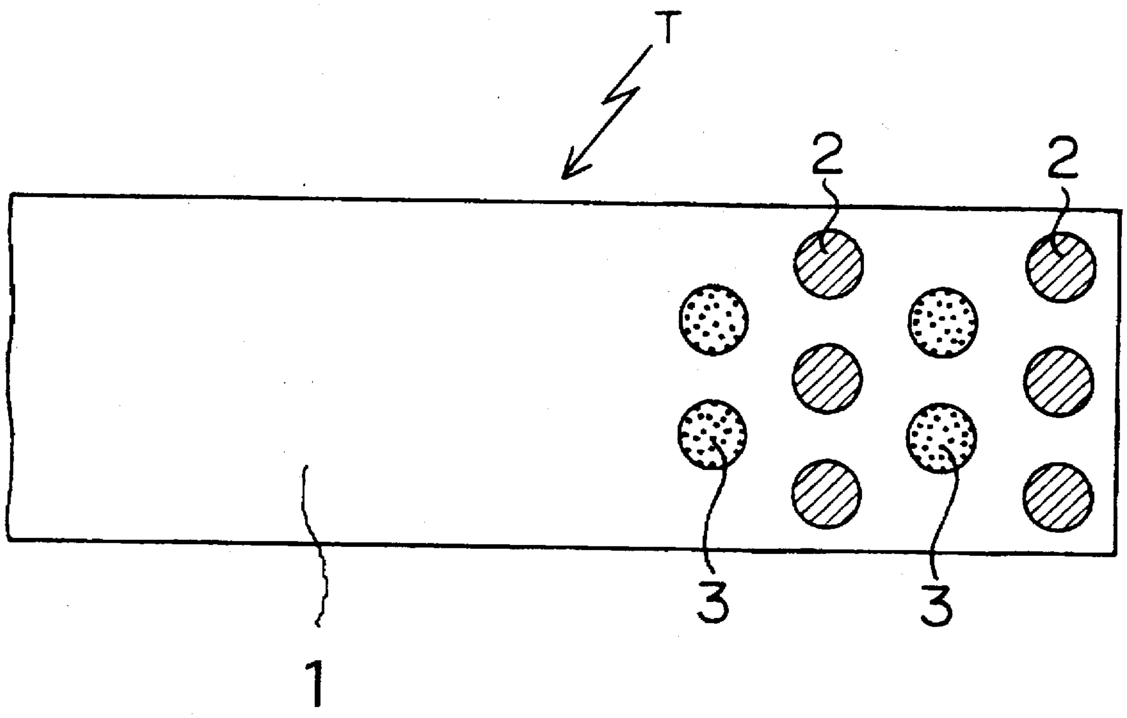
FIG. 4 is a plan view showing another modified version of coatings of the adhesive.

As shown in FIG. 3, the adhesive layers 2 and 3 may be formed on the tag T in the form of stripe along the length thereof. Alternatively, the adhesive layer 2 and 3 may be formed in spot manner as shown in FIG. 4. Arrangement of the adhesive layers 2 and 3 is not limited as far as they are formed at different areas on the substrate 1. The adhesive layers 2 and 3 may be partially overlapped (except for the arrangement in that one layer is completely included in the other layer) as far as they exist at different areas. The size and shape of the tag T may be appropriately selected depending upon the application. The tag which is approximately 1 cm by 8 cm in size is most versatile.

Basic Embodiment 2

Figure 5:
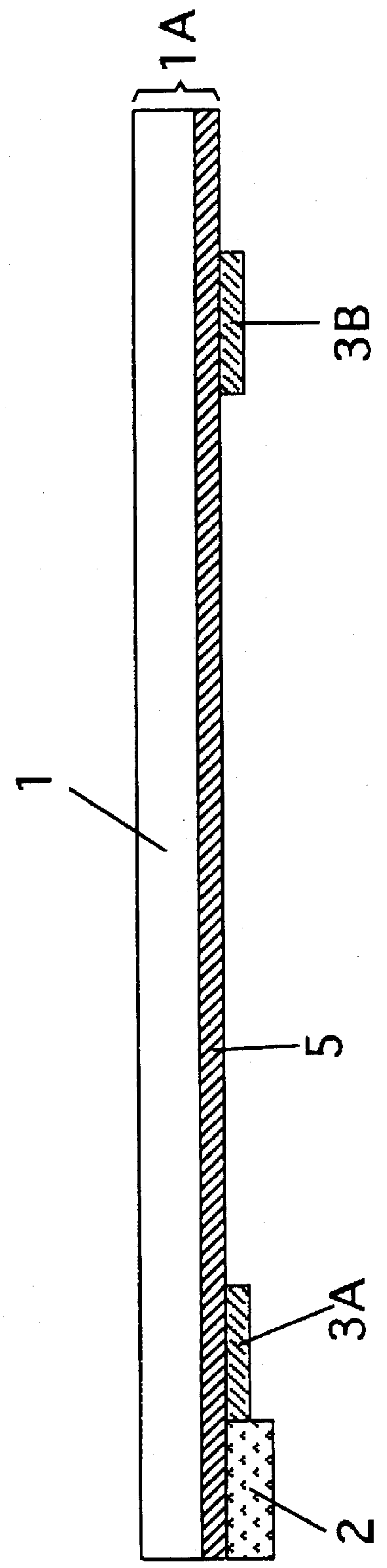
FIG. 5 is a perspective view showing a second basic embodiment of a laundry tag of the present invention.
Figure 6:
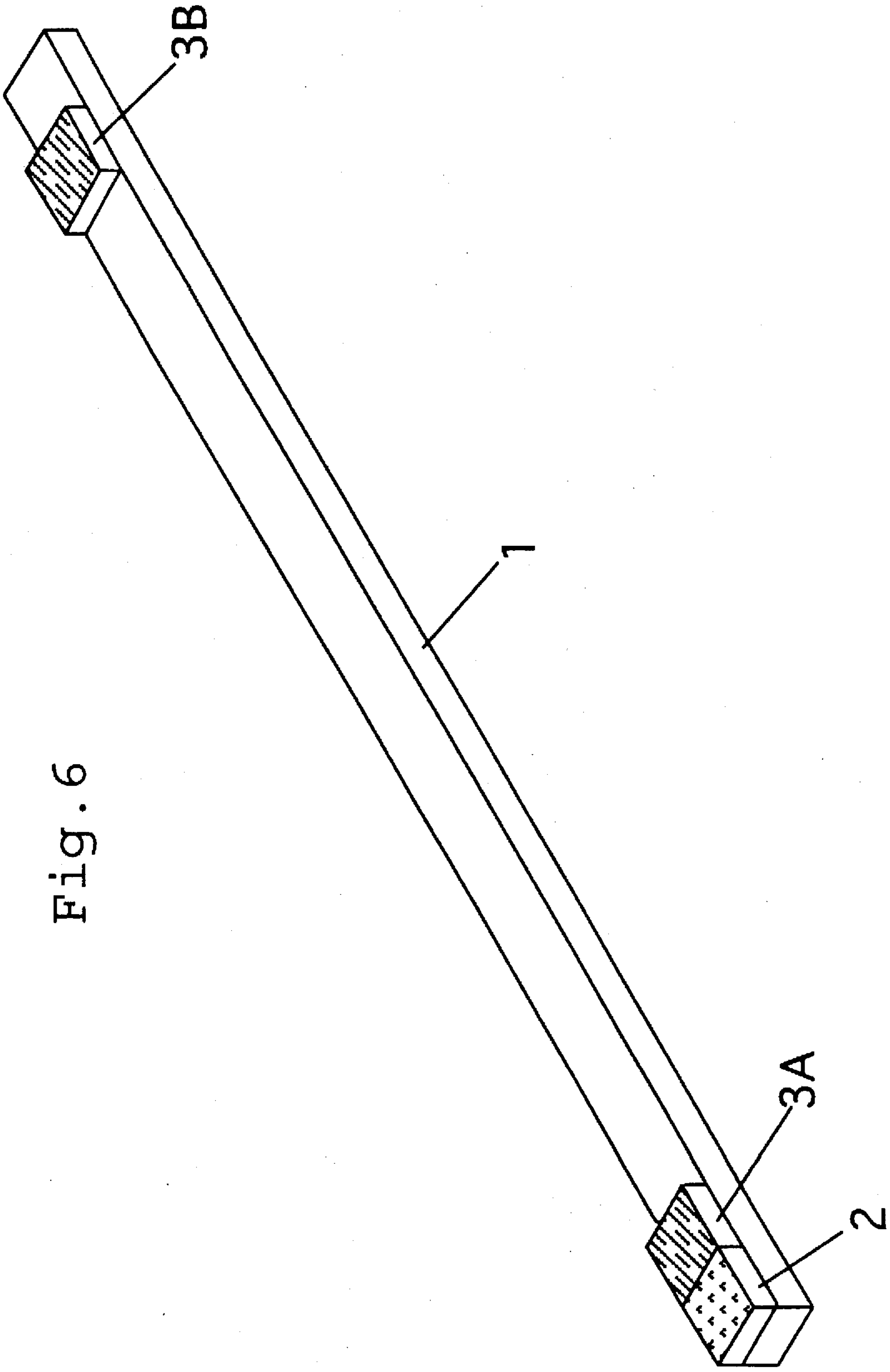
FIG. 6 is a perspective view of the laundry tag of FIG. 5.
Figure 7:
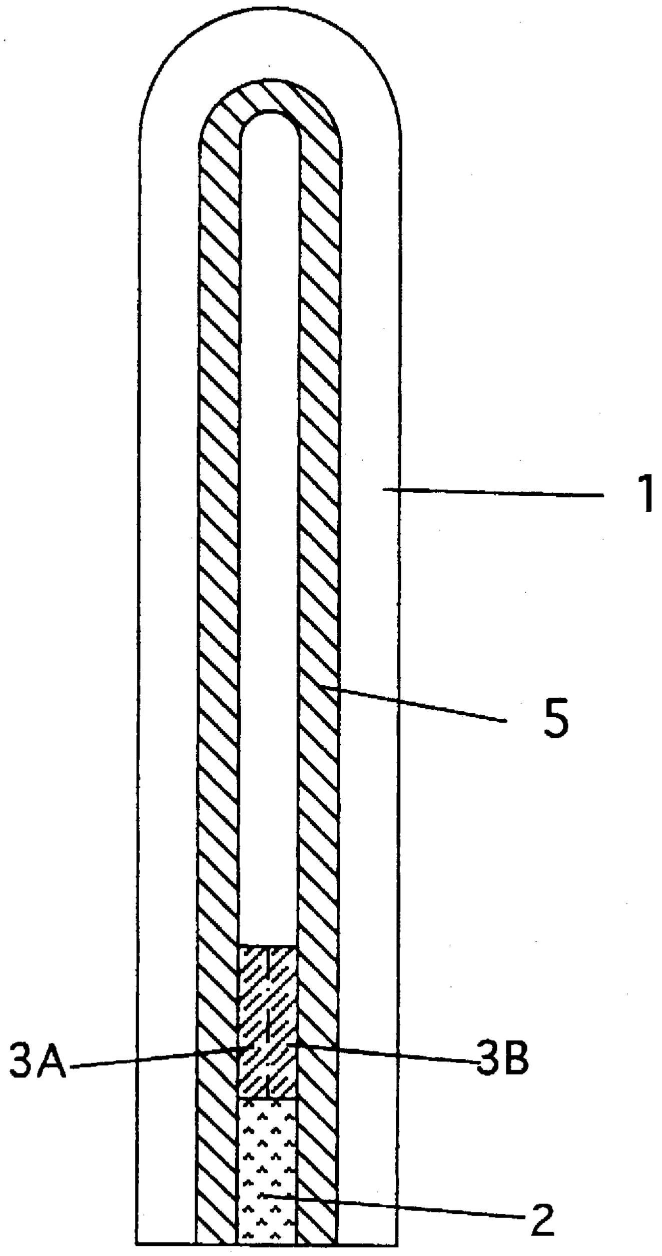
FIG. 7 is a longitudinal sectional view showing the attachment of the laundry tag.

Although the solvent-resistant adhesive layer 2 and the water resistant layer 3 are formed on only one end of the substrate 1 along the length thereof in the above mentioned embodiment, it is preferable for the above mentioned reason that the solvent-resistant adhesive layer 2 and the water-resistant layer 3A are formed at one end of the substrate 1 and only the water resistant adhesive layer 3B is formed at the other end of the substrate in such a position that the water-resistant layer 3B faces the water resistant layer 3A when the tag is looped in use as shown in FIGS. 5 through 7. FIG. 7 shows the attachment to a garment (not shown).

It is preferable to form a liquid penetration preventive layer 5 on the side of the substrate on which the adhesive layers 2, 3A and 3B are formed when the substrate 1 is made of paper. The solvent-resistant adhesive layer 2 and the water-resistant layers 3A, 3B resepctively are formed on the liquid penetration preventive layer.

It is preferable that the liquid penetration preventive layer be made of an emulsion of an acrylic resin exhibiting no adhesion and having such a heat resistance that is not softened at temperatures not higher than 180° C.

First Producing Method (Using a Double-Side Release Sheet)

Figure 8:
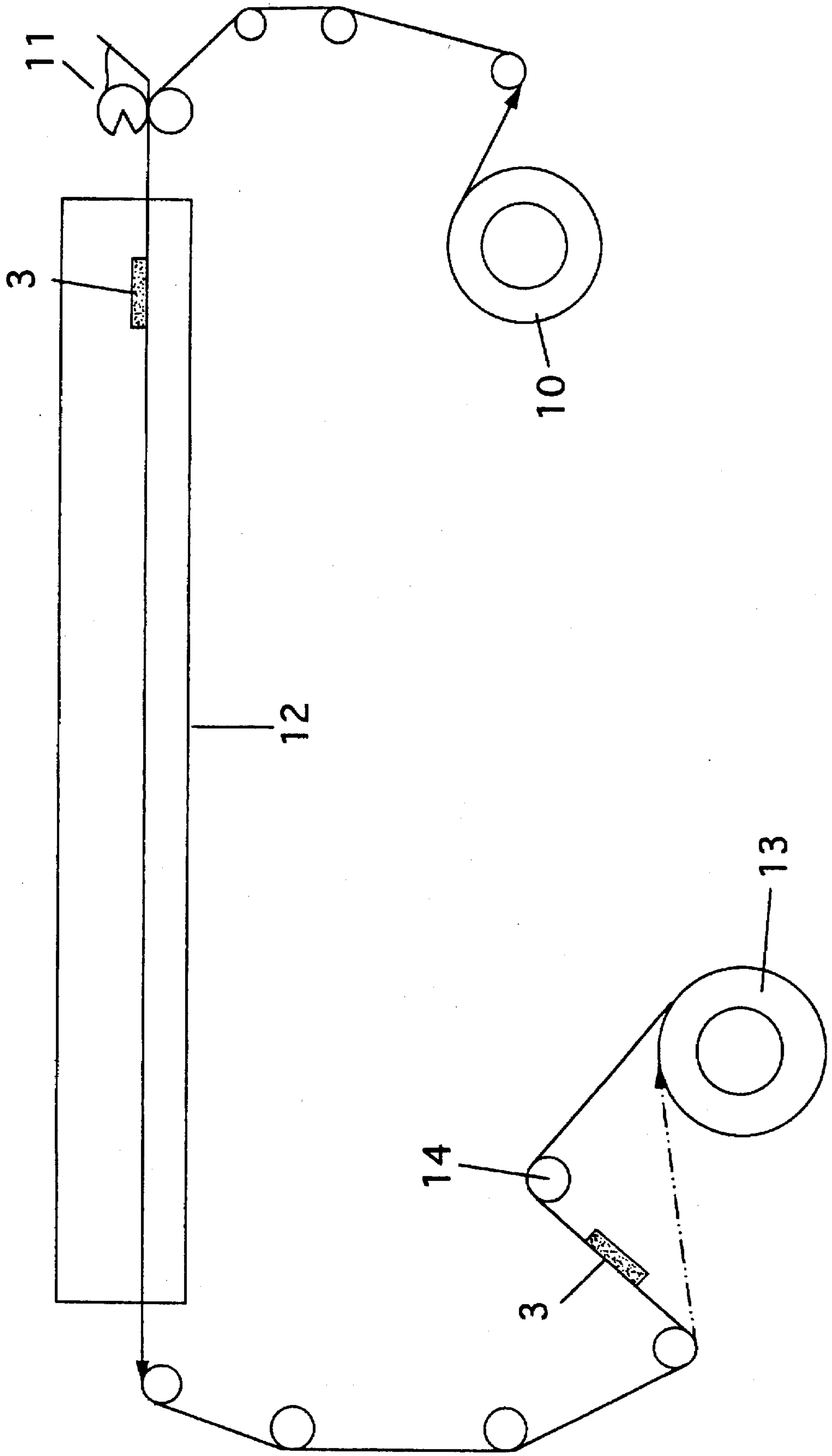
FIG. 8 is a schematic view showing a first step of a first method of producing of the tag of the first basic embodiment of the present invention.

The tag T, particularly that shown in FIG. 1 can be produced as follows: While a web of a release sheet 10 which has been releasably treated with silicone on both sides is conveyed as shown in FIG. 8, the web is continuously coated with a first adhesive, for example, water-resistant adhesive 3 in a striped and spaced manner along the length thereof by a coating machine 11. After the web has been dried with a drier 12, it will be taken up to provide a first adhesive coated web roll. Although the adhesive is applied in a striped mannerin the same drawing(also in FIG. 9), the adhesive is not shown striped for simplicity of illustration.

Figure 9:
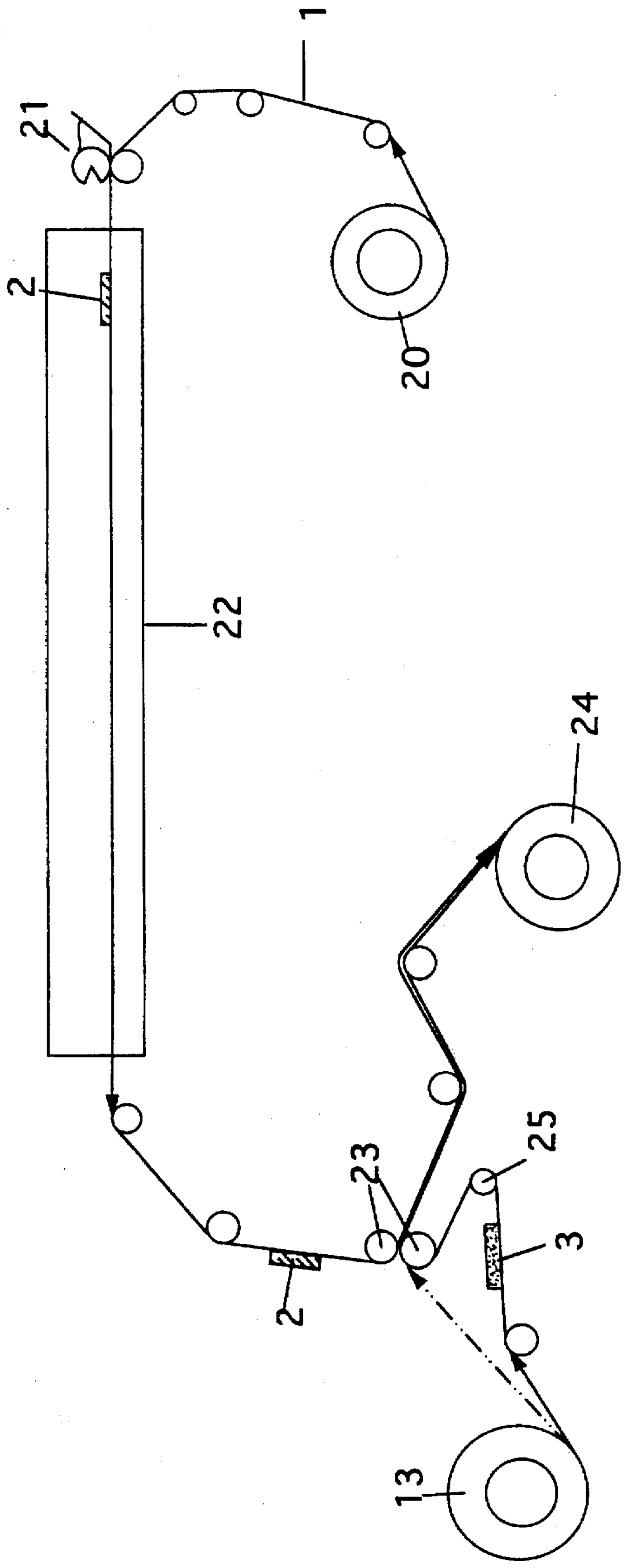
FIG. 9 is a schematic view showing a second step of the producing method of FIG. 8.
Figure 10:
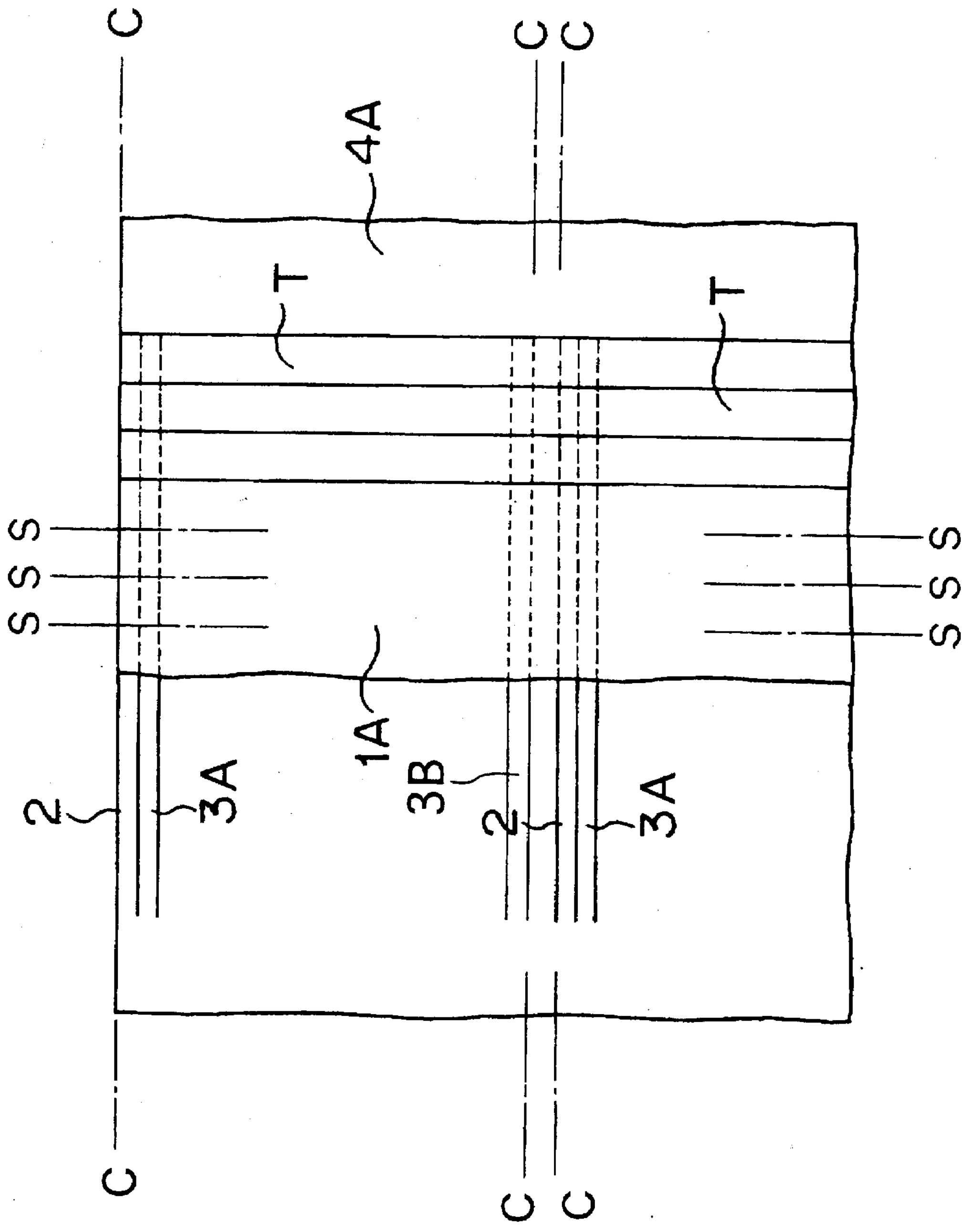
FIG. 10 is an explanatory view showing a flat sheet working.

On the other hand, while a substrate web 1 is conveyed from a roll 20 as shown in FIG. 9, it is continuously coated with a second adhesive, for example, solvent-resistant adhesive 2 in a striped and spaced manner along the length thereof by means of a coating machine 21. After the web has been dried, the first adhesive coated web from the roll 13 and the second solvent-resistant adhesive coated web from the roll 20 are overlappled each other by an overlapping roller 23 so that the first and second adhesive layers 3 and 2 are on the same side, the overlapped webs are taken up as a semi-product roll 24. In this case, alignment of the webs in coating and overlapping position is accomplished so that the first and second adhesive layers 2 and 3 are adjacent to each other.

Subsequently, a web from the semi-product roll 24 is delivered. The substrate is slit into tags T each having a predetermined size on a release sheet by a flat sheet working. Only substrate 1A web (including the adhesive layers) is provided with slits S excepting the release sheet 4A and is cut along a cutting line C into a length of tags T to provide overlapped sheets each having a predetermined length. The overlapped sheet includes a release sheet 4 having a predetermined size on which a plurality of tags are applied.

In use of tag T, each tag A peeled from the separable sheet 4 and is attached to the laundry item after necessary information is written thereon.

Figure 11:
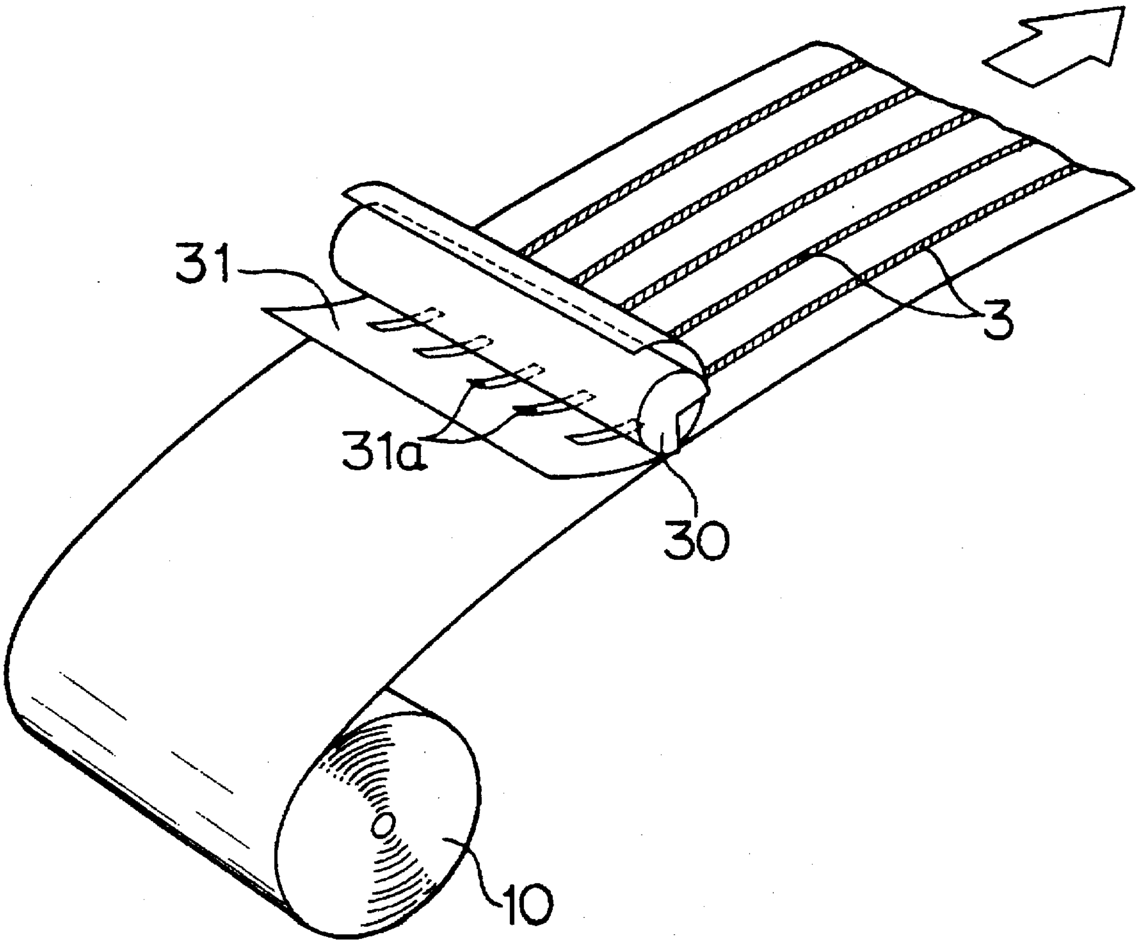
FIG. 11 is a perspective view showing a coating method of the adhesive.

An appropriate coating machine may be used for coating adhesive. Preferably, a comma coating machine 30 may be preferably used as shown in FIG. 11. When this type of coating machine is used, coating in stripe is difficult. Accordingly, dams of adhesive are formed of a film 31 such as polyester film. Slits 31*a* are formed in a spaced manner in a width direction. The adhesive may be applied through the slits 31*a*.

Figure 12:
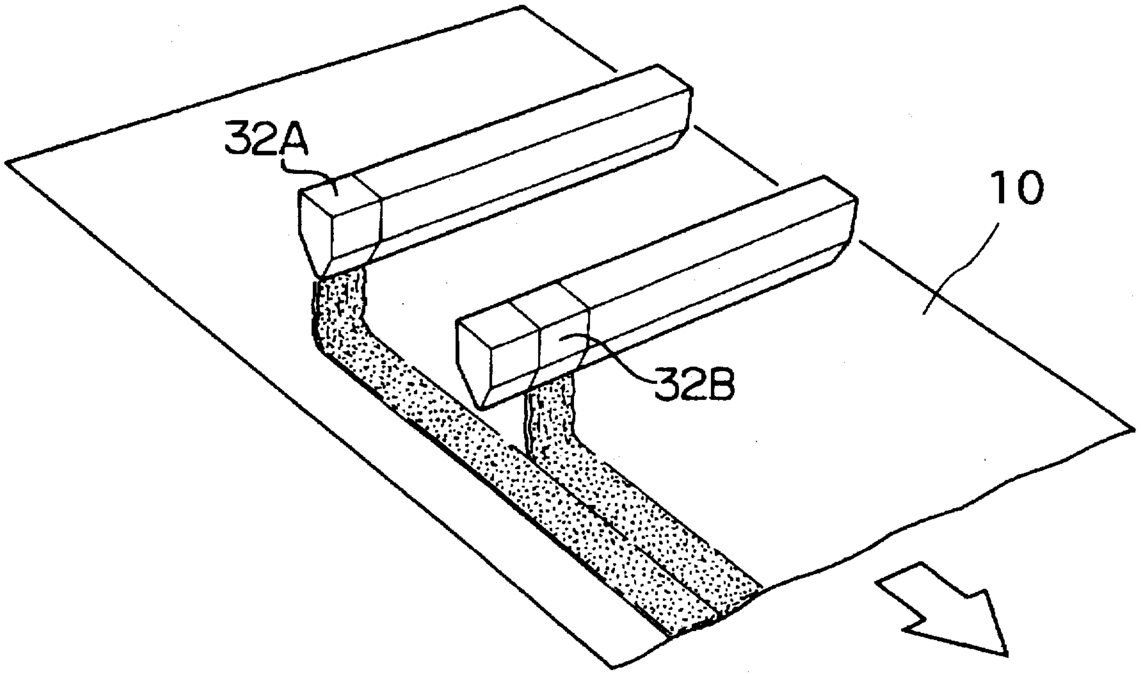
FIG. 12 is a perspective view showing another coating method of the adhesive.

Alternatively, a curtain coater having coating heads 32A and 2B which are arranged in a width direction may be used as shown in FIG. 12. In this case, adhesives from the coating heads 32A and 32B may be applied so that they partially overlap each other. Other coaters such as air knife coater, gravure coater, blade coater, roller coater may be used although not illustrated.

Second Producing Method (Using Single-Side Releasable Sheet)

In the first producing method, double side releasably-treated sheet is used. Use of the double side sheet has a number of problems. Firstly, when various items of information are printed on the outer surface of the laundry tags after they have become products, alignment is difficult to conduct due to slippage of the back surface of the double side releasable sheet. Secondarily, shrinkage of about 3 mm per entire width occurs since the substrate sheet 1 is passed through a drying machine as is apparent from FIG. 9. Misalignment in position in a width direction between the previously applied water-resistant adhesive 3 and the solvent-resistant adhesive 2 occurs.

Thirdly, since the adhesive 3 and 2 will impinge upon tension adjusting rollers 14, 25, respectively, it is necessary to take up the web to bypass the rollers as shown in phantom line. At a result, good tension control is difficult.

On the contrary, use of the single-sided relessable which will be described hereafter has such a problem. It is possible to preferably carry out the production.

Figure 13:
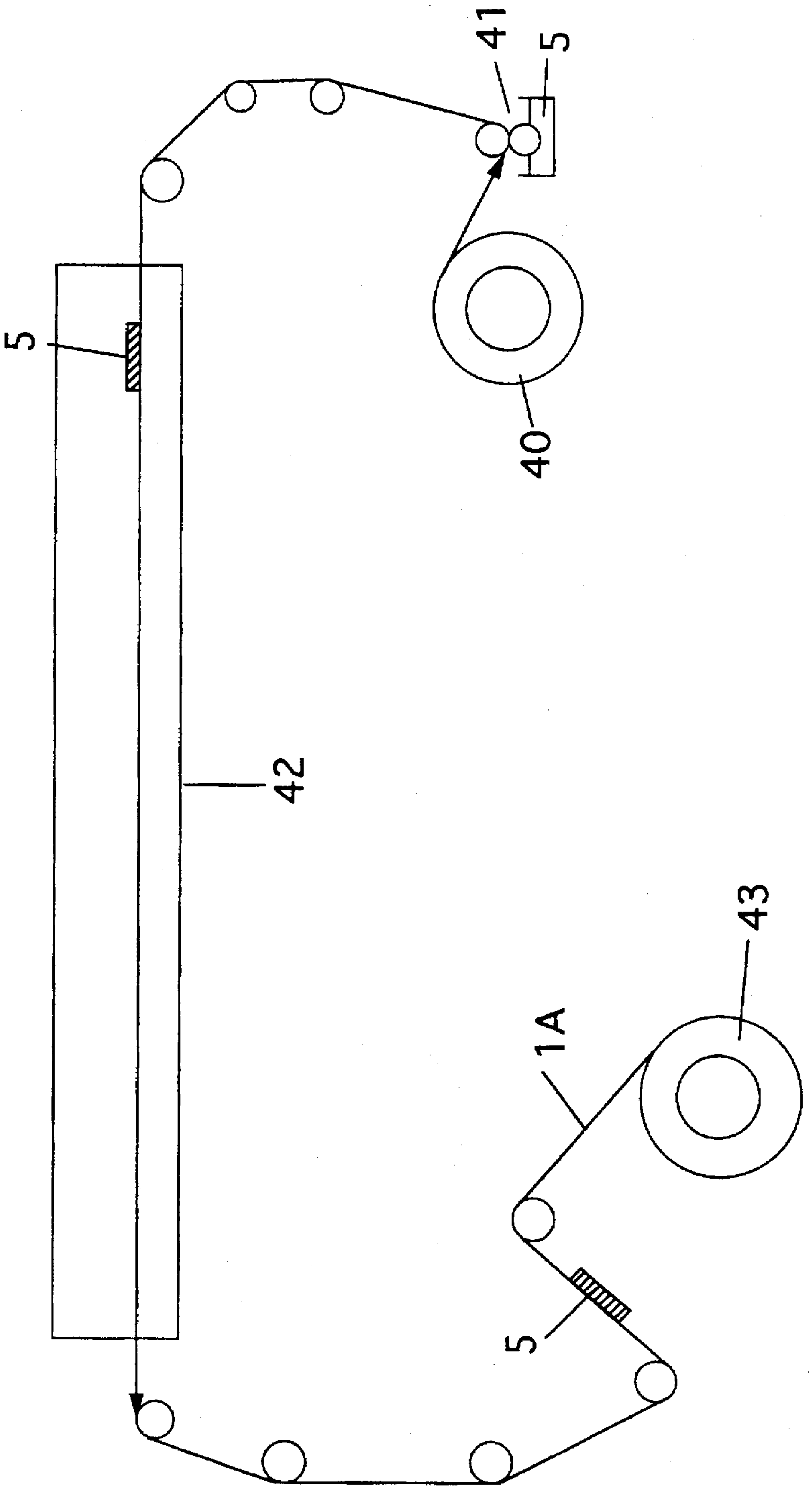
FIG. 13 is a schematic view showing a first step of a second method of producing of the tag of the second basic embodiment of the present invention.

Description will be made with reference to a case in which laundry tags of FIGS. 5 to 7 are produced. Firstly while a substrate web 1 is delivered from a roll 40 as shown in FIG. 13, a liquid penetration preventive layer 5 is coated over a substantially entire surface thereof by means of a kiss coater 41, it will be dried by passing through a drying machine 42. Thereafter it will be taken up as a substrate roll 43 of the substrate web 1A.

Figure 14:
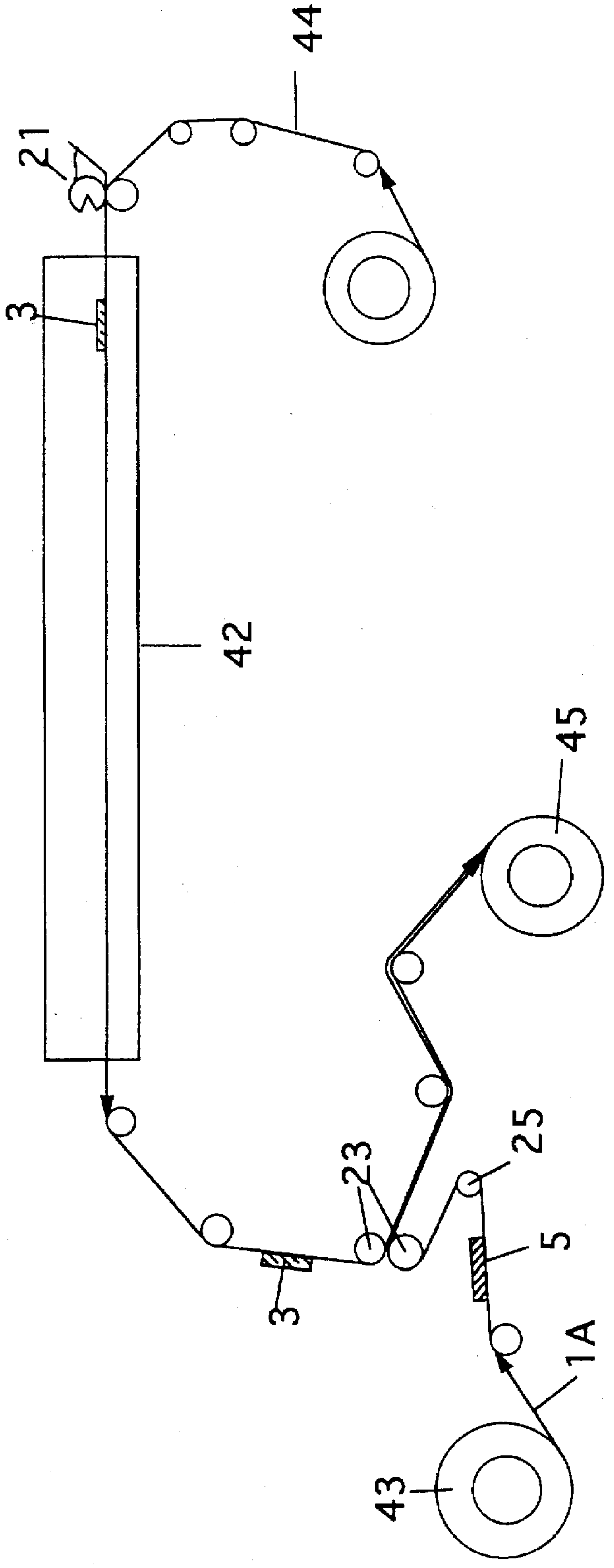
FIG. 14 is a schematic view showing a second step of the method of FIG. 13.

Subsequently, the first single-side releasably treated web is conveyed from a roll as shown in FIG. 14, the first adhesives 3A, 3B are continuously applied in a striped and spaced manner in a width direction by means of a coater 21. After dried, it will be overlapped on the substrate web 1A delivered from the substrate roll 43 and is then taken up to provide a roll 45 of the first adhesive coated web.

Figure 15:
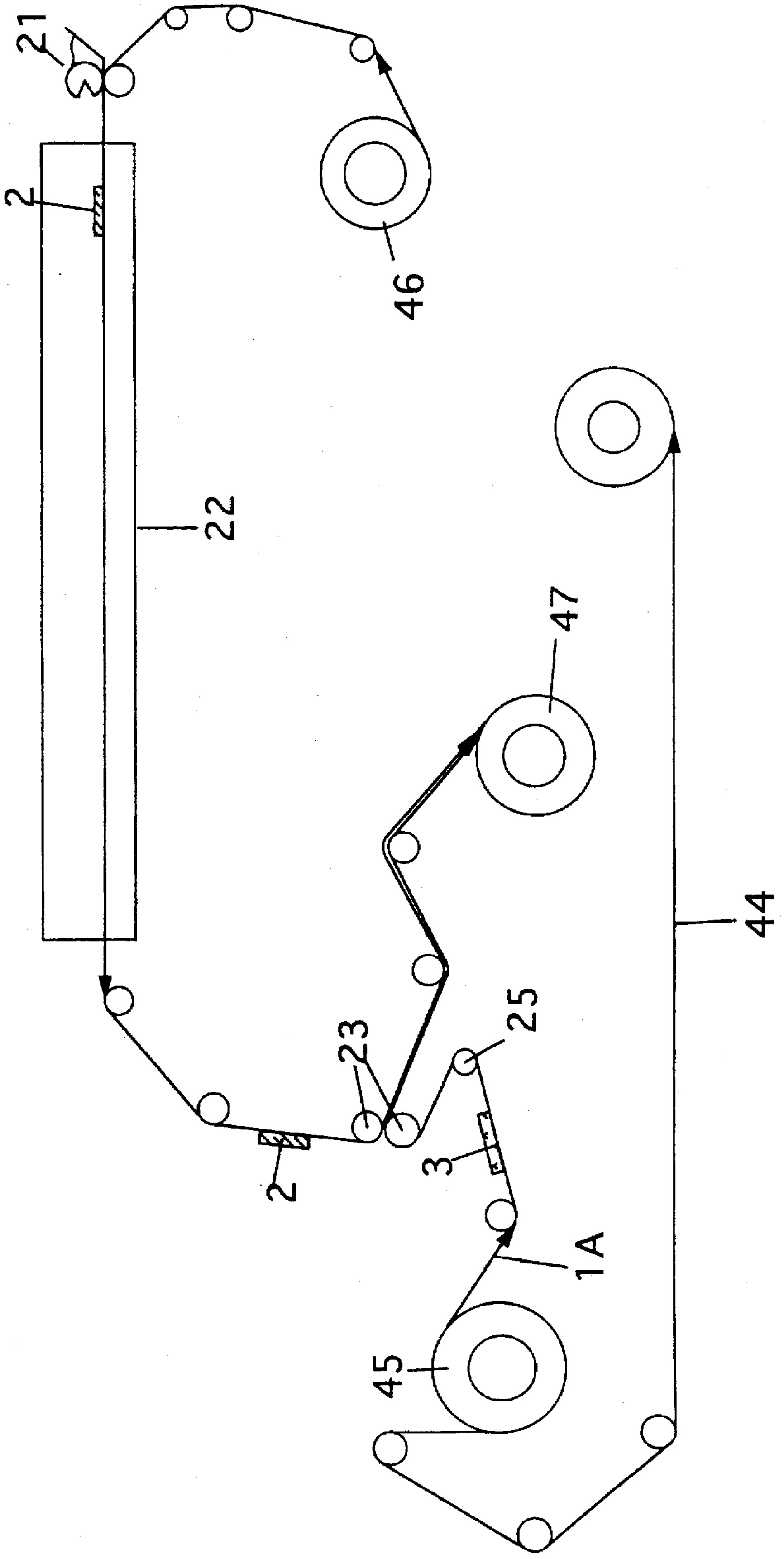
FIG. 15 is a schematic view showing a third step of the method of FIG. 13.

On the other hand, while the second single-side releasably treated web is delivered from a roll 46 as shown in FIG. 15, a second adhesive 2 is continuously applied on the web in a striped and spaced manner in a width direction and is dried to provide a second adhesive coated overlapped web. The first adhesive coated overlapped web is delivered from the roll 45. The first single-side release sheet 44 is peeled from the substrate web 1A which has been coated with the first adhesives 3A, 3B. Only the substrate sheet 1A is supplied to an applying position, in the illustrated example, the overlapping roll 23 where the substrate web 1A is adhered to the second adhesive coated overlapping web and the overlapped webs are taken up as a semiproduct roll 47.

Figure 16:
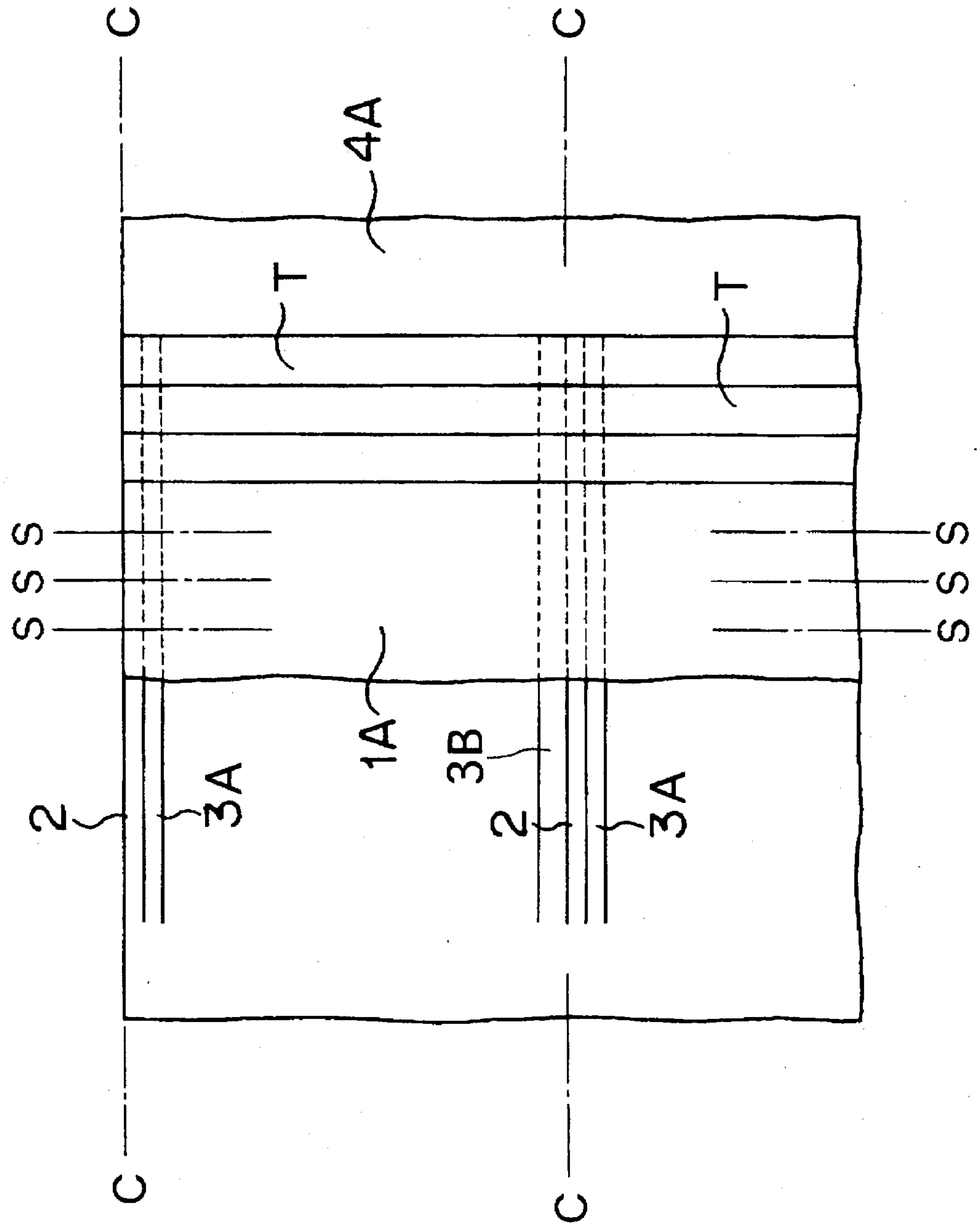
FIG. 16 is a plan view showing flat sheet processing.

A web is dispensed from the resultant semi-product roll 47 as is substantially similarly to the first producing method. The roll is slitted into the tags T each having a predetermined size by a gravure working as shown in FIG. 16 to provide an overlapped web including tags T applied on the second release sheet. That is, the web formed with slits which are spaced at widths of the tag T. An overlapped sheet having a predetermined length in left and right directions by cutting the web along cutting lines C spaced at the length of the tag T.

The the solvent-resistant adhesive and water-resistant adhesive employed in the present invention; after "include" insert—any of various—; delete "the above mentioned"; after "known" insert—solvent—and water-resistant"; after "adhesives," insert—nature rubber, styrene-botadiene rubber polyvinyl alcohol, and acryl resins which are commercially available" may include the above mentioned known adhesives, preferably acrylic adhesives, most preferably crosslinking type most preferably. Solvent type isocyanate crosslinked acrylic adhesive may be used for cleaning with water. Water soluble epoxy cross-linked acrylic adhesives may be used for dry-cleaning. The amount of the applied adhesive is such that the thickness of the dried coating film is 10 to 100 μm, most preferably 20 to 50 μm and coating weight is 10 to 70 g/m$^2$, in particular 30 to 50 g/m$^2$.

Although the substrate of the present invention is preferably made of paper in view of cost, film, unwoven fabric or their laminated sheets may be used. For writing of characters, symbols or bar codes representing various items of information on tags, paper is most preferable in respect of printability. For enhancing water-resistance and solvent-resistance as well as printability, various treating agents may be applied or impregnated on the side of the substrate on which no adhesives are applied.

The above mentioned liquid penetration preventive layer 5 serves also as an undercoat layer for each of adhesive layers 2, 3A and 3B. If a combination of dry cleaning and washing with water is conducted, the liquid penetration preventive layer should have both resistances to tricrene and water. Since the layer preferably has heat-resistance for ironing, heat-resistant acryl emulsion, particularly heat-resistant acrylic emulsion which is cross-linked formalin is preferable as this heat-resistant material. Specifically, the heat-resistant material includes single polymers of various acrylates or methacrylates, or copolymers of them with vinyl acetate, styrene, acrylnitrile, acrylamid, acrylic acid, methacrylic acid.

The coating weight of the liquid penetration preventive layers 5 is preferably 3 to 20 g/m$^2$, more preferably 3 to 10 g/m$^2$.

Figure 17:
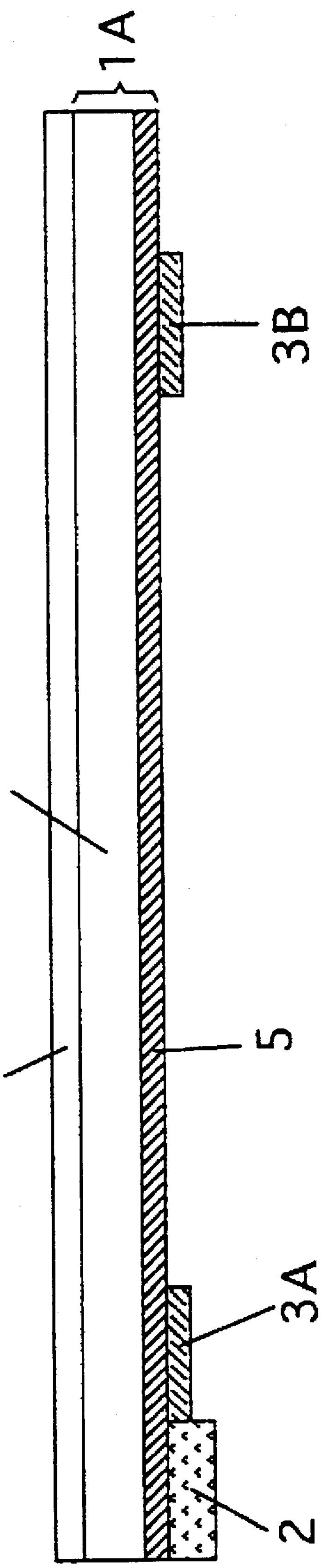
FIG. 17 is a longitudinal sectional view showing a third basic embodiment of a laundry tag of the present invention.

In lieu of or together with formation of the liquid penetration preventive layer 5, a plastic laminate layer 6 may be formed as shown in FIG. 17 on the opposite side of the paper substrate 1 on which no adhesive layer is formed. Polypropylene which is excellent in heat-resistance is preferable as material for the laminate layer 6 since polyethylene will be melt by heat from an iron. The laminate layer 6 may be laminated on the paper substrate by hot melt or with an appropriate hot melt adhesive.

Figures 18, 18A, 18B, 18C:
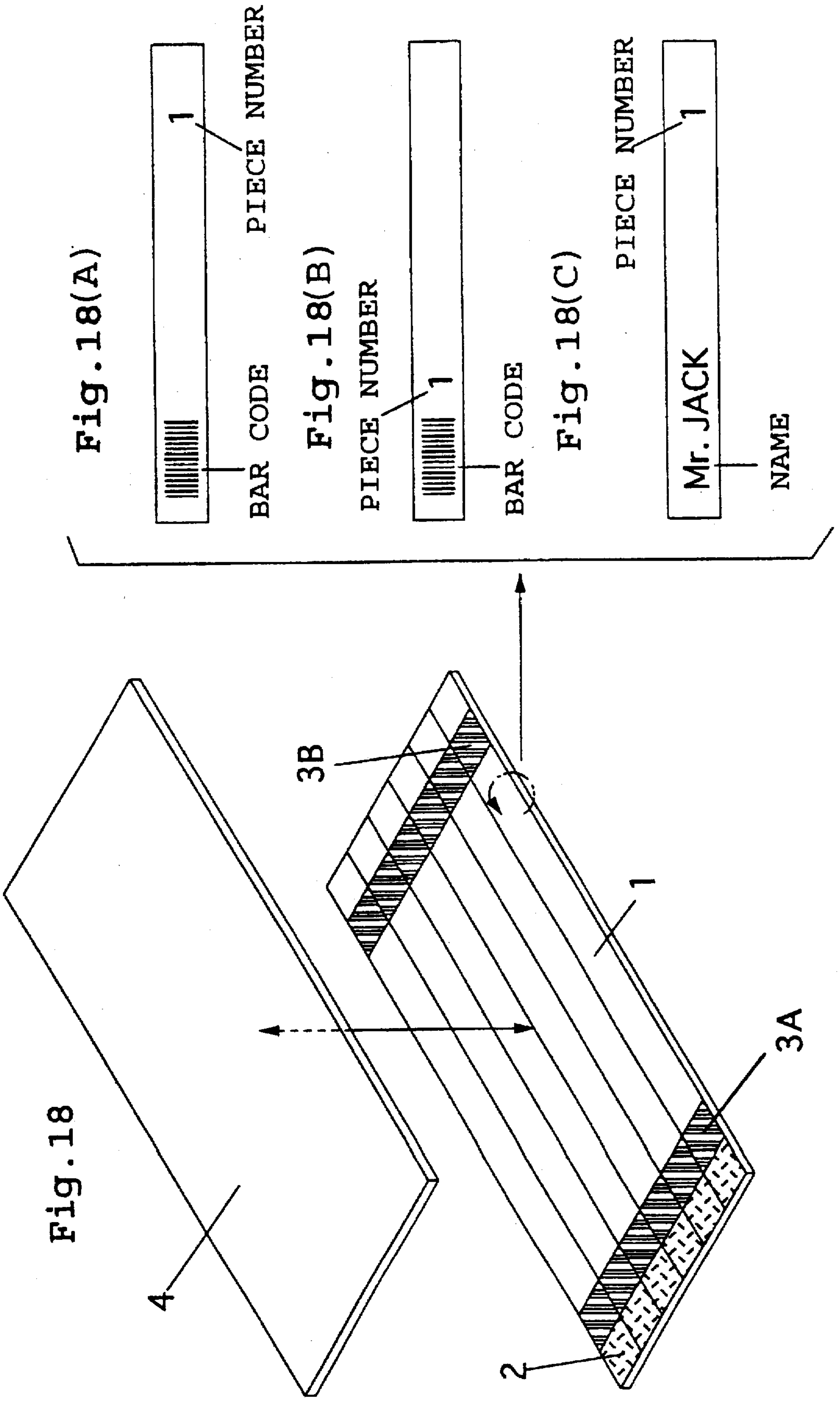
FIGS. 18, 18(A), 18(B) and 18(C) depict a laundry tag in accordance with the present invention illustrating identification thereon.
Figure 19:
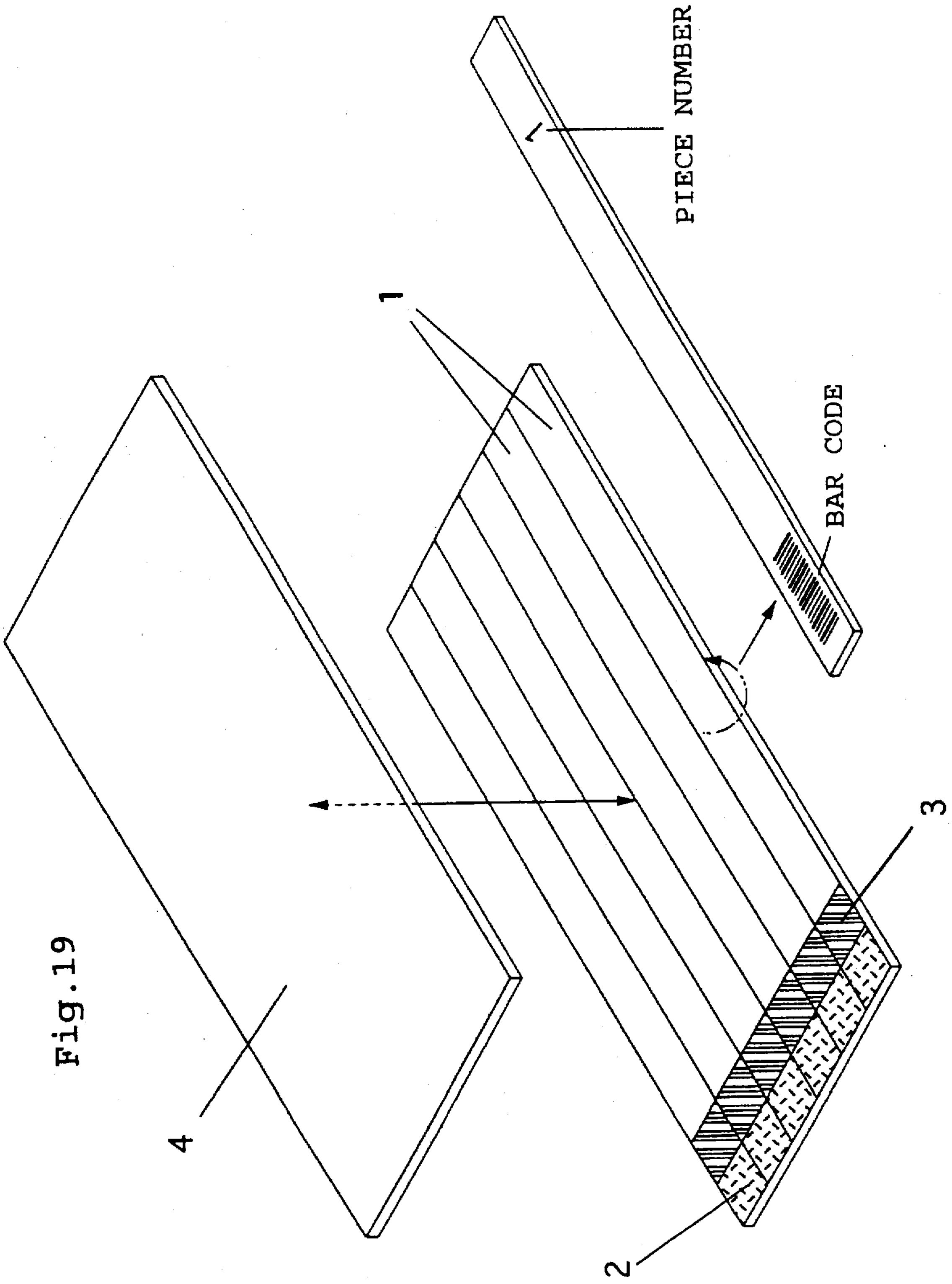
FIG. 19 is an explanatory view showing another example of identification.
Figure 20:
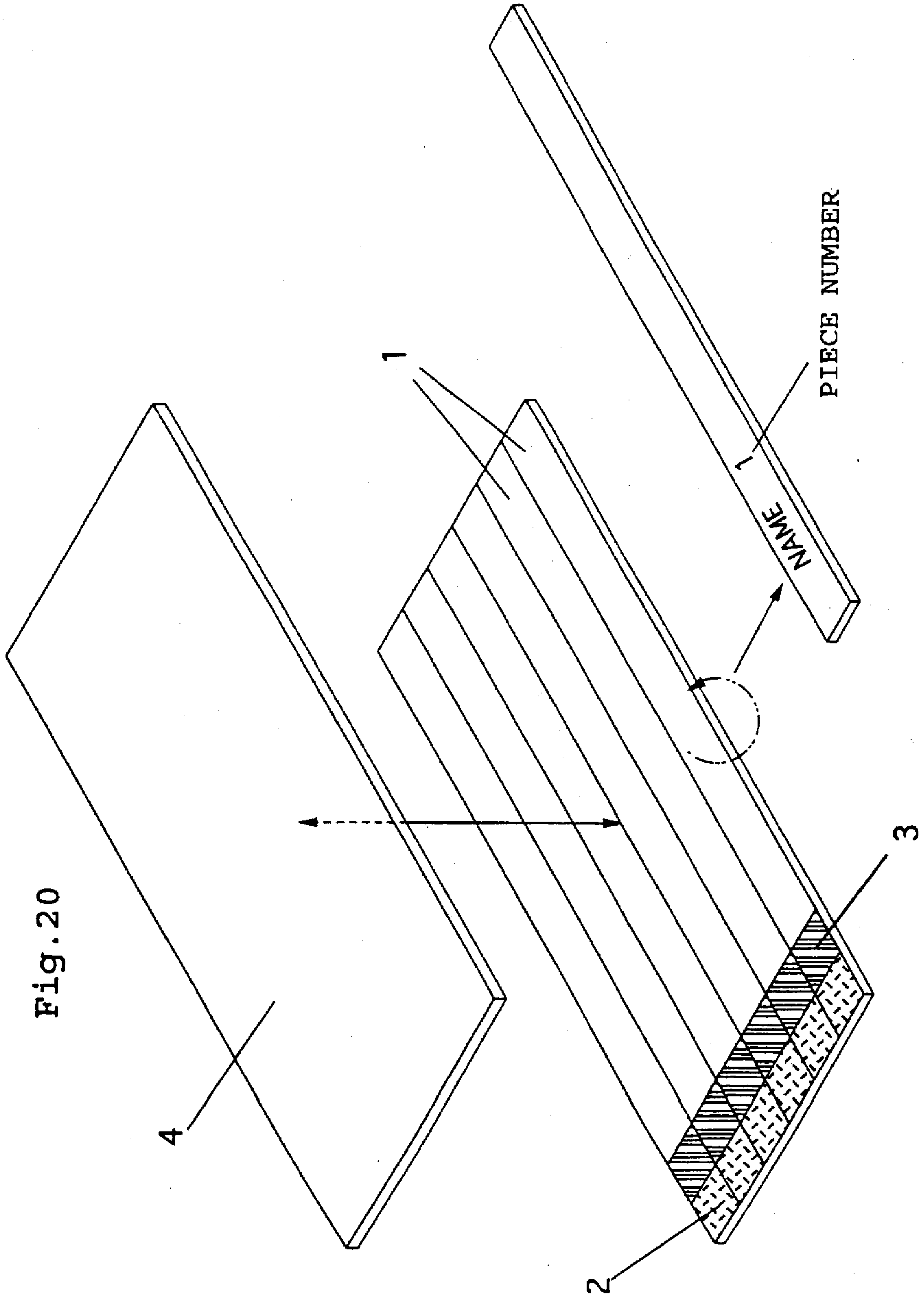
FIG. 20 is an explanatory view showing a further example of identification.
Figure 21:
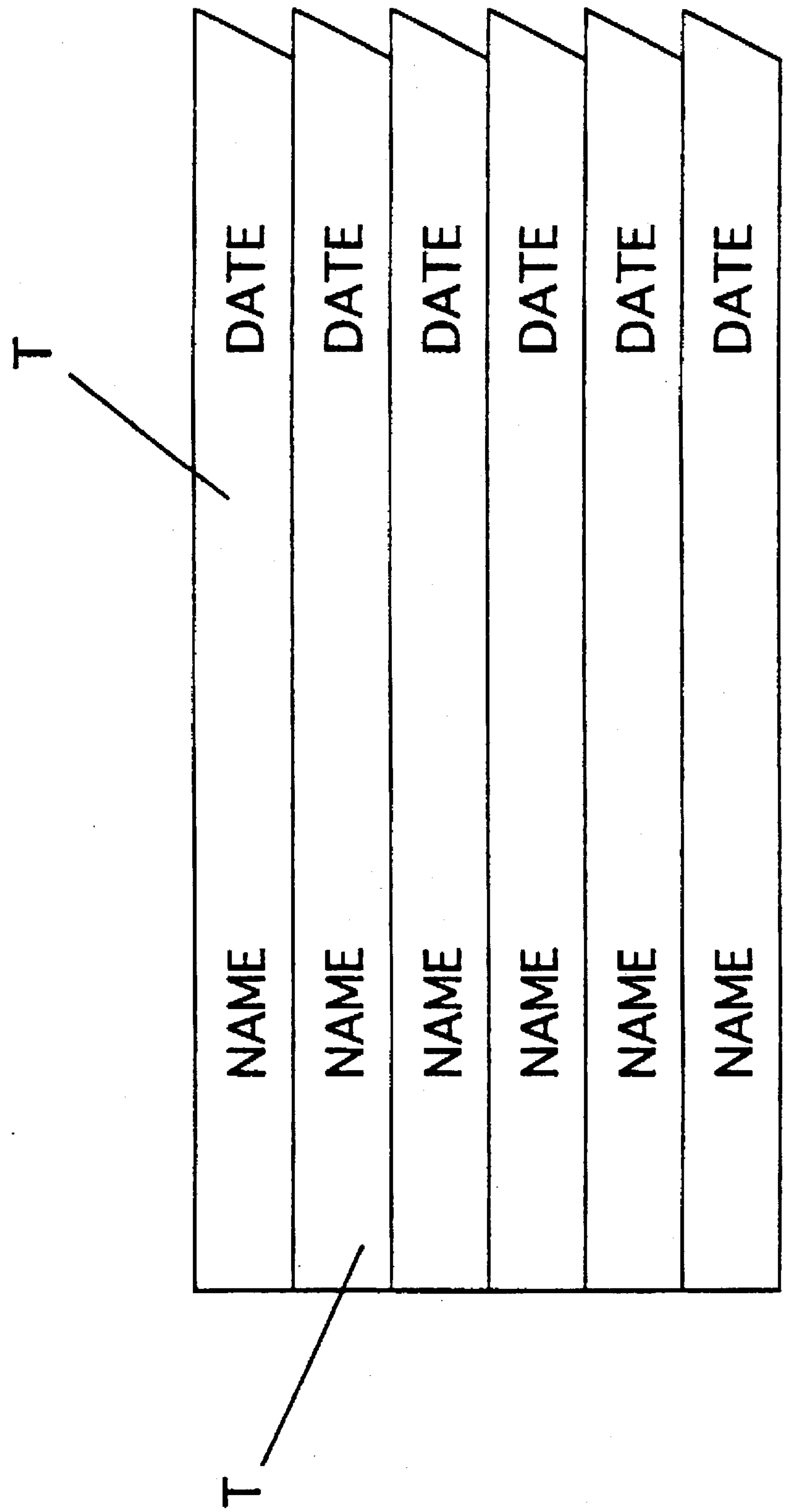
FIG. 21 is a plan view showing working on the end of the tag.

FIGS. 18 through 20 show the examples of identification of information on laundry tags of the second basic embodiment of FIG. 5. FIG. 18(A) shows one example of identification of a bar code representing various items of information and a piece number of the tag on the left and right sides, respectively of the tag with respect to a central folding line. FIG. 18(B) shows a tag bearing bar code and piece number on the left side thereof. FIG. 18(C) shows a tag bearing name and piece number on the left and right sides thereof, respectively. Such identification may be equally implemented to the laundry tag of the first basic embodiment shown in FIG. 1. These examples are illustrated in FIGS. 19 and 20. As shown in FIG. 21, the tags may be obliquely cut at one end thereof for enabling tags to be readily inserted. These tags of the present invention are not limited to those illustrated.

As mentioned above, the substrate made of paper is preferable in respect of cost, bending characteristics and touch. However, the kind of laundry tag can not completely prevent water from penetrating during washing with water, and it will be subjected to strong shear force water streams in a washing machine. As a result, interlayer separation may occur in a paper substrate.

If the opposite ends of the tag are overlapped each other and are fixed with a staple, problem is comparably less since the staple will prevent the laundry tag from releasing from a garment. In contrast to this, the laundry tag is attached to a garment with only adhesive. No staple is used. Preferable dynamic peeling strength in a Z-axis direction (a direction perpendicular to the surface) of the paper substrate which is required as paper characteristics (Internal bond) [reference standards TAPPI UM-403,584] is 2.5 to 4.0 kg/cm, in particular 3.0 to 3.5 kg-cm. Preferable wet strength [JIS P 8135] is 4.5 to 6.5, more preferably in a longitudinal direction (paper making direction) and 3.0 to 5.0, more preferably 3.8 to 4.5 kg in a lateral direction.

Experimental Examples

Now the advantages of the present invention will become more clear from the Experimental Examples.

Experimental Example 1:

Preliminary example shows that acrylic cross-linked type adhesives are preferable. Accordingly, various experiments was conducted by using this type of adhesive.

As shown in Table 1, total 9 types of adhesives which were commercially available from 5 manufacturers were applied to the paper substrate by changing the amount of the hardening agent. Subsequently, the paper substrate was cut into rectangular tags each having a size 1 cm×8 cm.

13 types of tags were measured in relation to resistances against water-washing and dry-cleaning. Reagent including 0.5% of high molecular detergent, 0.5% of sodium percarbonate, and 0.5% of soda methasilicate which complies A-4 and A-5 methods of JIS L 0844 was used to determine the resistance to washing with water. Perchloroethylene was used persuant to JIS L 0860 to determine the resistance to dry-cleaning. Petroleum solvent "WHITE N10" prepared by Japan Energy Co., Ltd. was used to determine the resistance to Experiments were conducted as follows: The samples were folded and adhered each other and was dipped in each of liquids. The liquid was agitated for 30 minutes by means of a magentic stirrer. Then the samples were taken out from the liquid. Results are shown in Table 1 in which X denotes a sample exhibiting separated areas, Δ denotes a sample which has no separated area, but remarkably lowers bonding force, and ○ denotes a sample in which there is no separated area and the bonding force is not substantially lowered.

TABLE 1

| SAMPLE No | ADHESIVES | HARDENING AGENT (PARTS) | PERCHLOROETHYLENE RESISTANCE | SOL RESISTANCE | ALKALINE WATER RESISTANCE | REMARKS |
|---|---|---|---|---|---|---|
| 1 | A Co.S1 | 2.0 | Δ | Δ | ○ | ISOCYANATE CROSSLINKED |
| 2 | B Co.S1 | 1.0 | X | X | ○ | ISOCYANATE CROSSLINKED |
| 3 | | 1.5 | X | X | ○ | |
| 4 | | 2.0 | X | X | ○ | |
| 5 | B Co.S2 | — | X | X | ○ | SELFCROSSLINKED EMULSION |
| 6 | C Co.S1 | 1.7 | Δ~○ | Δ~○ | ○ | ISOCYANATE CROSSLINKED |
| 7 | C Co.S2 | 0.5 | Δ | Δ | X | AQUEOUS EPOXY CROSSLINKED |
| 8 | | 1.0 | ○ | ○ | Δ | |
| 9 | | 2.0 | ○ | ○ | Δ | |
| 10 | D Co.S1 | 1.5 | X | X | ○ | ISOCYANATE CROSSLINKED |

TABLE 1-continued

| SAMPLE No | ADHESIVES | HARDENING AGENT (PARTS) | PERCHLOROETHYLENE RESISTANCE | SOL RESISTANCE | ALKALINE WATER RESISTANCE | REMARKS |
|---|---|---|---|---|---|---|
| 11 | D Co.S2 | 0.24 | X | X | O | ISOCYANATE CROSSLINKED |
| 12 | E Co.S1 | 2.0 | X | X | O | ISOCYANATE CROSSLINKED |
| 13 | E Co.S2 | 2.0 | X | X | O | ISOCYANATE CROSSLINKED |

These results show that no samples meet all the requirements.

Experimental Example 2:

Tags which are shown in FIG. 1 were produced by selecting samples 6 and 7 which exhibited preferable results in experiment 1. Similar experiment of these samples showed that no separation occurred. Thereafter, a lot of samples were produced by an actual producing machine in accordance with the above mentioned producing method. Actually, tags were threaded through button holes of 50 dress shirts, which were dry-cleaned for 7 minutes and washed with water for 40 minutes. No tags were detached.

Experimental Example 3:

Tags which are shown in FIG. 1 were produced by selecting samples 6 and 9 which exhibited preferable results in experiment 1. Similar experiment of these samples showed that no separation occurred. Actually, tags were threaded through button holes of 50 dress shirts, which were dry-cleaned for 15 minutes and washed with water for 80 minutes at more severe conditions. Tags of FIG. I exhibits no separation after dry cleaning. Two tags exhibited separation after washing with water. Tags of FIGS. 5 and 6 exhibited no separation.

Experimental Example 4:

Tags which are shown in FIG. 1 were produced by selecting samples 6 and 9 which exhibited preferable results in experiment 1. Similar experiment of these samples showed that no separation was exhibited. Actually, tags were threaded through button holes of 100 dress shirts, 50 tags were only dry-cleaned for 20 minutes and 50 tags were washed with only water for 100 minutes. Every cleaning caused no detachment.

In accordance with present invention, there can be provided laundry tags which are excellent in solvent-resistance and water-resistance so that they are durable against dry cleaning and/or washing with water.

What is claimed is:

1. A laundry tag including an elongated substrate and adhesive layers at opposite ends on one side thereof, which is threaded through part of a laundry item and then adhered at the adhesive layers so that it is looped and in which cleaning of the laundry item is conducted while the tag is attached to the laundry item, characterized in that said adhesive layers each comprises a solvent-resistant adhesive and a water-resistant adhesive and in that these adhesive layers are formed on one side of the substrate at different areas.

2. A laundry tag as defined in claim 1 in which said substrate is made of paper and a liquid penetration preventing layer is formed on the substrate, and said solvent-resistant adhesive layer and water-resistant adhesive layer are formed on the liquid penetration preventing layer.

3. A laundry tag as defined in claim 2 in which said liquid penetration preventing layer is made of an acrylic resin emulsion having heat-resistance and no adhesion which is not softened at temperatures not higher than 180° C.

4. A laundry tag as defined in claim 1 in which said solvent resistant adhesive layer is formed on the substrate at the distal end thereof and said water-resistant adhesive layer is formed in inner position relative to said solvent-resistant layer.

5. A laundry tag as defined in claim 1 in which said solvent-resistant and water-resistant adhesive layers are formed at one end on one side of the substrate and only water-resistant adhesive layer is formed at the other end thereof on the same side in such a position that the latter water-resistant adhesive layer faces the water-resistant adhesive layer when the tag is looped by bringing the adhesive layers together.

6. A laundry tag sheet in which a plurality of the laundry tags as defined in claim 1 are juxtaposed to each other and provisionally adhered to a releasing sheet which is treated to provide the sheet with releasability.

7. The laundry tag as defined in claim 1 is attached to a laundry item which is to be dry cleaned or washed with water.

* * * * *